United States Patent [19]

Rogers

[11] Patent Number: 4,730,462
[45] Date of Patent: Mar. 15, 1988

[54] EVAPORATIVE PRECOOLING UNIT

[76] Inventor: Allen R. Rogers, 5358 W. Yucca St., Glendale, Ariz. 85304

[21] Appl. No.: 859,443

[22] Filed: May 5, 1986

[51] Int. Cl.$^4$ ................................................ F28D 3/00
[52] U.S. Cl. ......................................... 62/171; 62/91; 62/305
[58] Field of Search .................... 62/304, 171, 305, 91

[56] References Cited
U.S. PATENT DOCUMENTS
3,427,005  2/1969  Kuyendall .............................. 62/305

Primary Examiner—Henry A. Bennet
Attorney, Agent, or Firm—Nissle & Leeds

[57] ABSTRACT

An improved evaporative cooling unit. The unit efficiently cools air when the evaporative cooling pad is dry and utilizes the turbulent intermixing of air and water to evaporatively cool air without requiring excess water flow onto and from the cooling pad.

2 Claims, 6 Drawing Figures

EVAPORATIVE PRECOOLING UNIT

This invention relates to evaporative cooling systems.

More particularly, the invention relates to an evaporative cooling unit which is utilized to precool air flowing over a refrigeration unit condenser coil and which extends the operational life of the porous, wetted heat transfer pad utilized in the evaporative cooler.

In another respect, the invention relates to an evaporative precooling unit in which excess water does not flow from the bottom of the heat transfer pad and which therefore does not require a sump for storage of excess water or require a hose to drain excess water from the precooler unit.

In a further respect, the invention relates to an evaporative precooling unit which, in the vicinity of the precooling unit, reduces the incidence of arthropods such as arachnids and oval, flat bodied Blattidae insects, and reduces the incidence of smut, rot and other fungi which produce disagreeable odors and provide a breeding ground for disease.

In still another respect, the invention pertains to an evaporative precooling unit which efficiently cools air when the evaporative cooler pad is dry, which utilizes the turbulent intermixing of air and water to evaporatively cool air without requiring excess water flow onto and from the cooler pad, and which minimize the accumulation of water on the condenser coil of a refrigerator unit.

In yet a further respect, the invention relates to an evaporative precooling unit in which the pad is moistened and cooled by a stream of air flowing through the pad.

Evaporative precoolers have long been utilized to reduce the temperature of air being drawn over the condenser coil of a refrigeration unit. In operation, water flows onto a pad in the precooling unit. Heat in air flowing through the pad is consumed in evaporating water in the pad, reducing the temperature of the air.

While evaporative precooling systems require the construction and use of relatively simple equipment and consume only minimal amounts of electricity, there are disadvantages inherent in such systems. Water soaked pads create substantial resistance to the flow of air through the pads and can saturate the air with water droplets which are carried from the evaporative cooling pad to the refrigeration unit cooling coil. When water on the coil evaporates, mineral deposits form on the coil. Further, evaporative cooling units have acquired the apt name of "swamp coolers" because they promote the formation of mildew and other fungi which produce disagreeable odors. Since evaporative cooling units are utilized in warm ambient temperatures and provide a ready source of water, components of the cooling units are susceptible to corrosion and decay. In particular, when conventional cooler pads fabricated from paper are utilized, the steady flow of water through the pads leaches protective chemicals from and causes the disintegration of the pads, making the pads potential hosts for growths of slimes. Sump trays which collect excess water from the pad or hoses carrying water away from the pad support growths of algae and fungi plant diseases like rot and smut. Infestations of cockroaches, rodents and other vermin which emerge during the night are attracted to the vicinity of the cooler units and leave their excrement larvae.

Accordingly, it would be highly desirable to provide an improved evaporative precooling unit which would not produce excess water and which would minimize the leaching and disintegration of paper pads which occurs when water is sprayed onto the pads or is directed onto the top of and flows downwardly through the pads.

Therefore, it is a principal object of the invention to provide an improved evaporative cooling unit.

A further object of the invention is to provide an improved evaporative cooling unit which reduces the likelihood that infestations of arachnids, cockroaches, rodents and other nighttime vermin will occur in the vicinity of the cooling unit, and which reduces the likelihood that water bearing components of the cooling unit will serve as hosts for algae, rot, smut and other growths which produce disagreeable odors and provide a breeding ground for disease.

Another object of the instant invention is to provide an improved evaporative precooling unit which efficiently cools air when the normally wetted porous precooler pad is dry, which utilizes the turbulent intermixing of air to evaporatively cool air, and which minimizes the accumulation of water on the coil of a refrigeration unit.

Still a further object of the invention is to provide an improved evaporative cooling unit which does not produce excess water and which therefore does not require a sump or hose for handling of excess water.

Yet another object of the invention is to provide an improved evaporative cooling unit which extends the operational life of the porous, wetted heat transfer pad utilized in the cooling unit.

These and other, further and more specific objects and advantages of the invention will be apparent to those skilled in the art from the following detailed description thereof, taken in conjunction with the drawings, in which.

Figure 1:
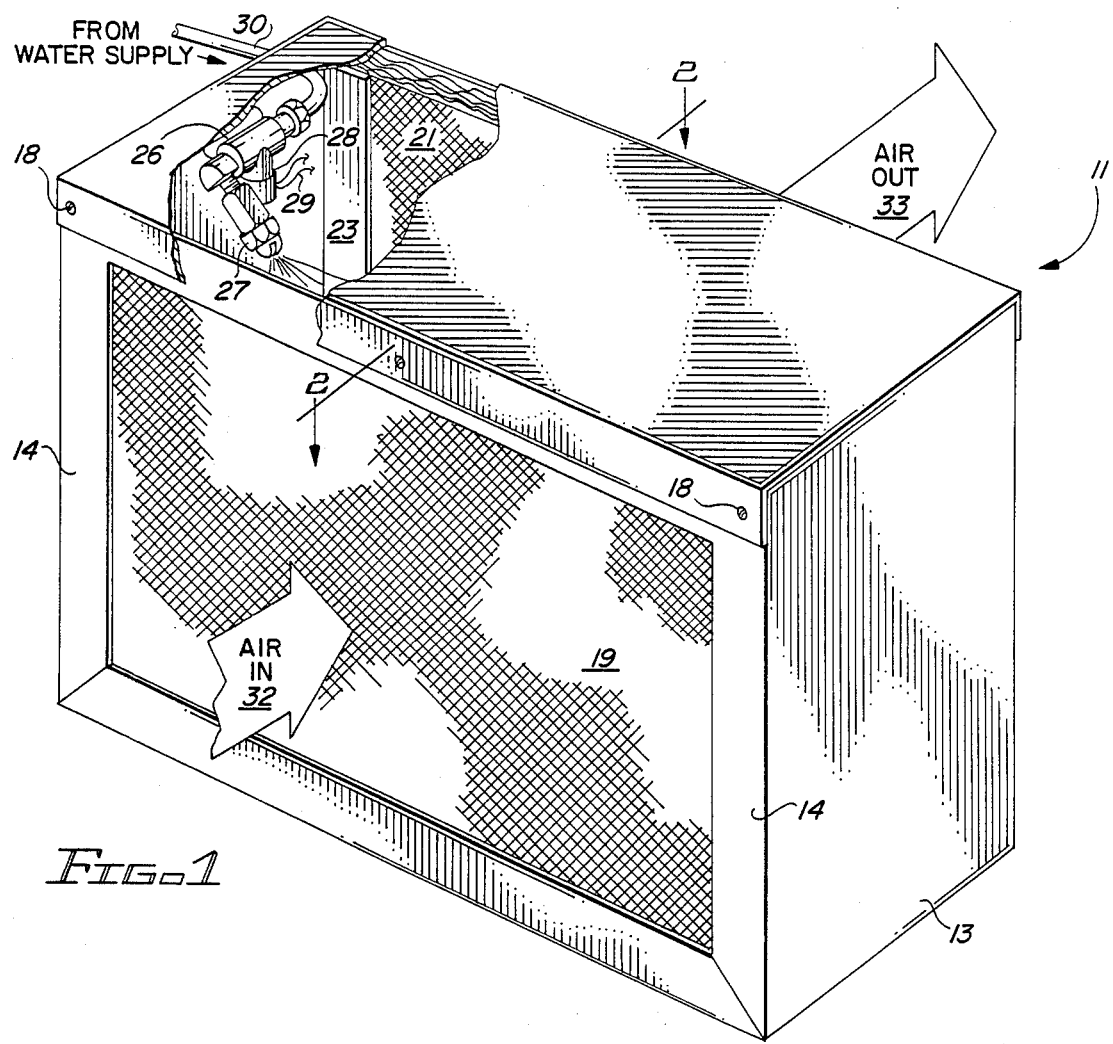
FIG. 1 is a perspective view illustrating an evaporative cooler unit constructed in accordance with the principles of the invention.
Figure 2:
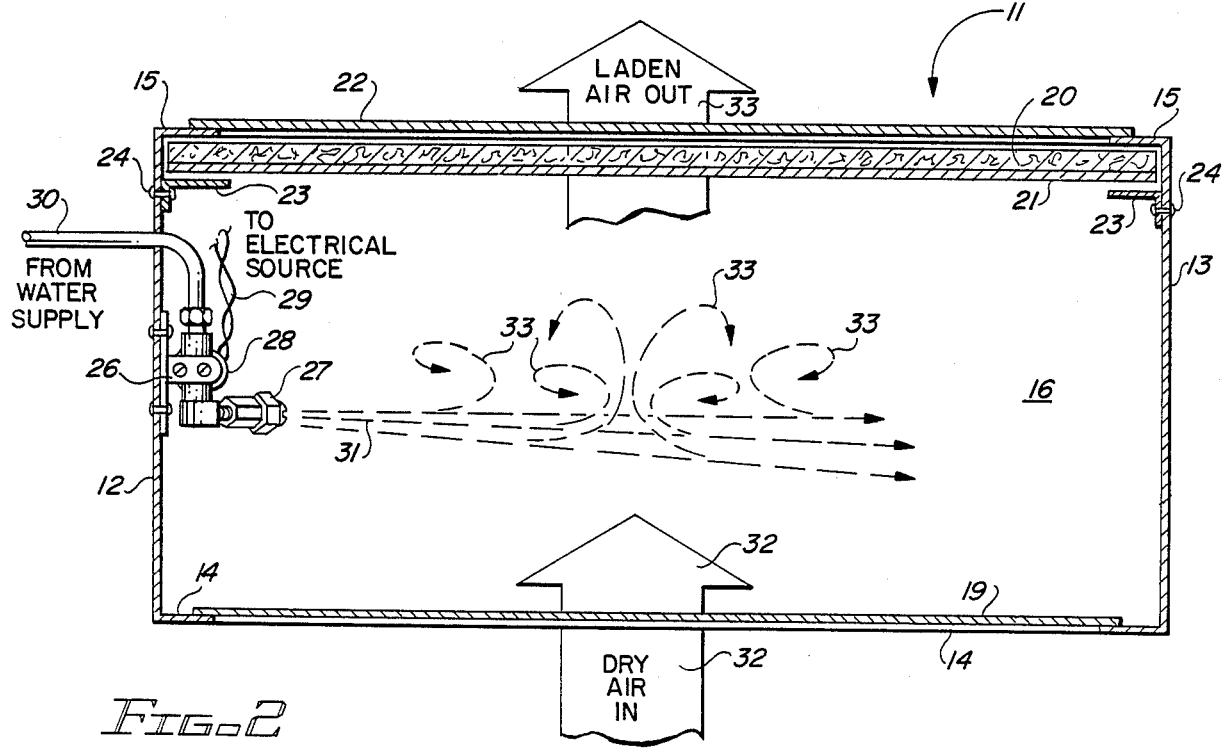
FIG. 2 is a top section view of the cooler unit of FIG. 1 taken along section line 2—2 thereof and further illustrating interior construction details thereof.

Briefly, in accordance with my invention, I provide a heat exchange unit for precooling an air stream traveling toward and over the condensing coil of a refrigeration unit. The heat exchange unit includes a frame; a porous heat transfer pad mounted in the frame; nozzle means carried on the frame for directing a spray mist forwardly of the heat transfer pad, the spray mist emitted from the nozzle means initially traveling in a direction such that the mist will not contact the heat transfer pad; means mounted on the frame for causing turbulent intermixing of the airstream with the spray mist prior to the airstream passing into the heat transfer pad; and, means for controlling the quantity of water emitted by the nozzle means such that substantially all of the spray mist is intermixed with the air stream prior to the airstream passing through the heat transfer pad.

In another embodiment of my invention, I provide a method of precooling an air stream traveling toward and over the condenser coil of a refrigeration unit. The method includes the steps of positioning an evaporative heat exchange unit forwardly of the refrigeration unit condensor coil such that the air stream travels through the heat exchange unit prior to traveling over the condensor coil, and operating the heat transfer unit to precool the air stream. The heat exchange unit includes a frame; a porous dry heat transfer pad mounted in the frame and having a lower edge; nozzle means carried on the frame for directing a spray mist forwardly of the heat transfer pad, the spray mist emitted from the nozzle means initially moving in a direction of travel such that the spray mist will not contact the heat transfer pad; means mounted on the frame for causing the turbulent intermixing of the airstream with the spray mist prior to the airstream passing through the porous heat transfer pad; and, means for controlling the quantity of water emitted by the nozzle means such that substantially all of the spray mist is intermixed with and evaporated in the air stream prior to the airstream passing through the heat transfer pad. Excess water does not flow from the lower edge of the pad during operation of the heat exchange unit.

Turning now to the drawings, which depict the presently preferred embodiments of the invention for the purpose of illustrating the practice thereof and not by way of limitation of the scope of the invention, and in which like reference characters represent corresponding elements throughout the several views, FIGS. 1-5 illustrate an evaporative cooling unit constructed in accordance with the principles of the invention and including a frame having side walls 12 and 13, front wall 14, rear wall 15, floor 16, top 17 removably secured to front wall 14 by screws 18, screen grating 19 attached around its peripheral portions to wall 14, porous paper heat transfer pad 20 secured to grating 21, and grating 22 attached to rear wall 15. L-shaped strips 23 are secured to side walls 12 and 13 by rivets 24 and, along with rear wall 15 and the portions of wall 12 spanning the distance between wall 15 and strips 23, forms an elongate generally vertically oriented U-shaped groove into which pad 20 and grating are slidably inserted. Fitting 26 secured to wall 12 fixedly maintains nozzle means 27 and control means 28 in position adjacent walls 12. Control means 28 is powered by electricity delivered by wires 29. Water is delivered to control means 28 and nozzle means 27 through conduit 30. Control means 28 includes a sensor (not shown) which monitors the temperature and humidity of the ambient air and adjusts the flow of water through nozzle means 27 such that the large majority of water emitted from nozzle means 27 as spray mist stream 31 is evaporated or carried in stream of air 32 flowing into and through the evaporative cooling unit 11. Air stream 33 leaving unit 11 generally, depending on the temperature and humidity of the ambient air in stream 32, has a temperature cooler than that of air in stream 32. Gratings 19, 21 and 22 interrupt the generally laminar flow of air in stream 32 and cause the formation of eddy currents 33 and turbulence in stream 32 as it passes into unit 11. This turbulence facilitates the intermixing of mist stream 31 in stream 32 to evaporate a substantial portion of mist stream 31 in stream 32 prior to stream 32 passing into cooler pad 20. The flow rate of spray mist stream 31 from nozzle 27 is regulated by control unit 28 such that the very large majority of mist stream 31 is carried and evaporated in stream 32 and such that there is not an excess of mist stream 31 which falls toward the floor 16 and forms a puddle of water thereon. The flow rate of mist stream 31 from nozzle means 27 refers both to the volume of water emitted by nozzle means 27 and to the velocity of the mist when it initially leaves nozzle means 27. If the volume of water emitted by nozzle 27 is too great, then stream 32 will not evaporate or carry away all of mist stream 31 and a puddle of water will form on floor 16. If the velocity of water, i.e., the pressure, of water emitted from nozzle means 27 is too great in relation to the size of the mist particles, then portions of mist stream 31 may travel through stream 32, impinge on wall 13, combine with other mist particles, and flow down wall 13 to floor 16.

Figure 6:
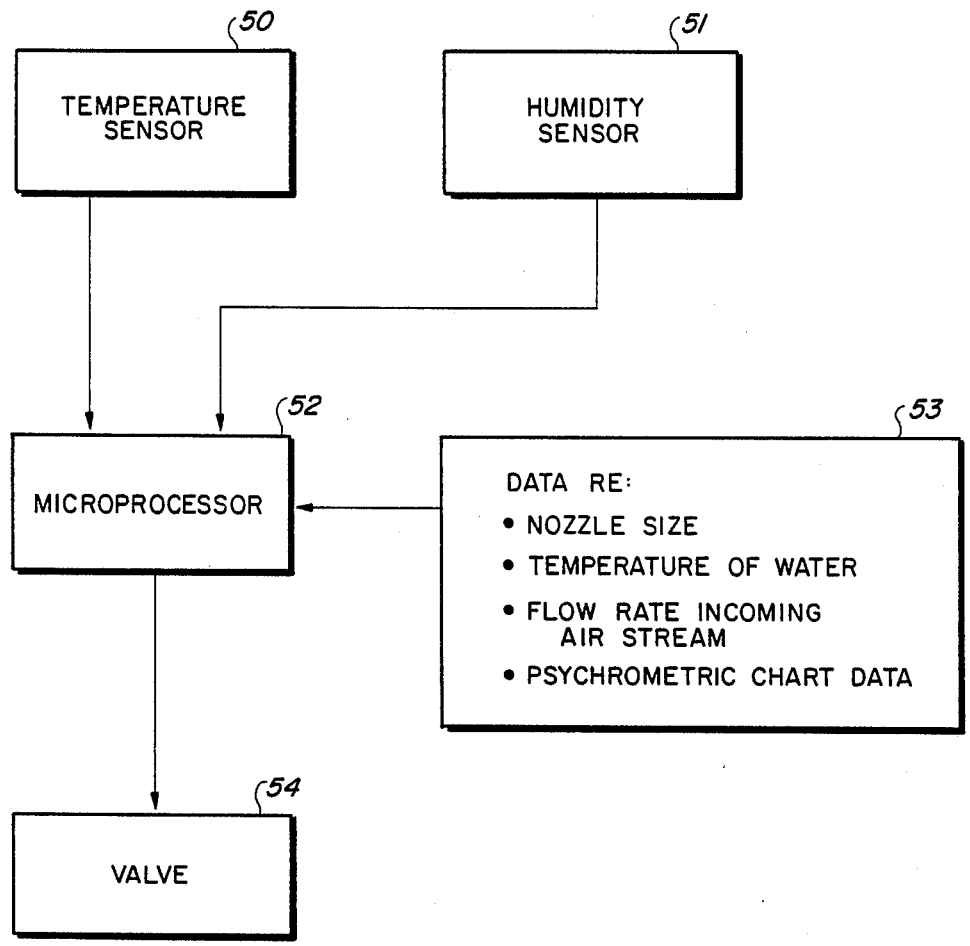

Spray mist is emitted from nozzle means 27 in a direction of travel which will not carry the mist into contact with grating 21. While in FIG. 2 portions of mist 31 can be directed toward grating 21 and still be contacted and evaporated by stream 32 before contacting grating 21, it is preferred that mist stream 31 have an initial direction of travel which is parallel to or moving away from screen 20. If spray mist stream 31 impinges pad 20, efficient evaporation of water in air stream 32 is more difficult to achieve and the water from stream 31 tends to accumulate in and flow downwardly through pad 20. When excess water flows downwardly through pad 20, protective anti-fungi chemicals are leached from pad 20 and a pool of excess water forms in the bottom of unit 11. The size of water droplets in spray mist stream 31 can vary; however, a very fine particle size is desired in order to facilitate evaporation of the water in stream 32 prior to the time stream 32 flows into and through pad 20. A microprocessor embodiment of the invention like that described above is depicted in FIG. 6 and includes temperature sensor 50, humidity sensor 51, microprocessor 52, valve 54, and data 53 contained in the microprocessor memory.

Pad 20 functions to remove unevaporated water droplets from stream 32 and to filter out dust, etc. from stream 32. During operation of unit 11, pad 20 normally becomes damp but does not produce excess water which drips or flows from the pad. This is, as earlier described, accomplished by control means 28 which adjusts the flow rate of water through nozzle means 27 such that the majority of the volume of spray mist 31 emitted from nozzle means 27 is evaporated in stream 32 before stream 32 flows into pad 20. Control means 28 includes a valve and a microprocessor. Sensors (not visible) continually monitor and provide the microprocessor with the ambient air temperature and humidity, the volume and velocity of air streams 32 and 33, and the temperature and pressure of water flowing through conduit 30. The microprocessor is also provided with data such as the size of water particles emitted through nozzle means 27; data showing the relationship between the wet bulb temperature, the dry bulb temperature and the humidity of the ambient air; data showing the interrelationship between the temperature, vapor pressure and humidity of air; the amount or degree of turbulent air flow caused by screens 19, 21 and 22; and, formulae the other data which readily permit the microprocessor to determine the proper flow rate of spray mist stream 31 from nozzle means 27 into air stream 32 in order to allow generally all of mist 31 to be evaporated or carried in stream 32 to avoid the formation of puddles of excess water inside unit 11. The programming and data necessary for the microprocessor to make these calculations are well known to those of ordinary skill in the art.

Figure 3:
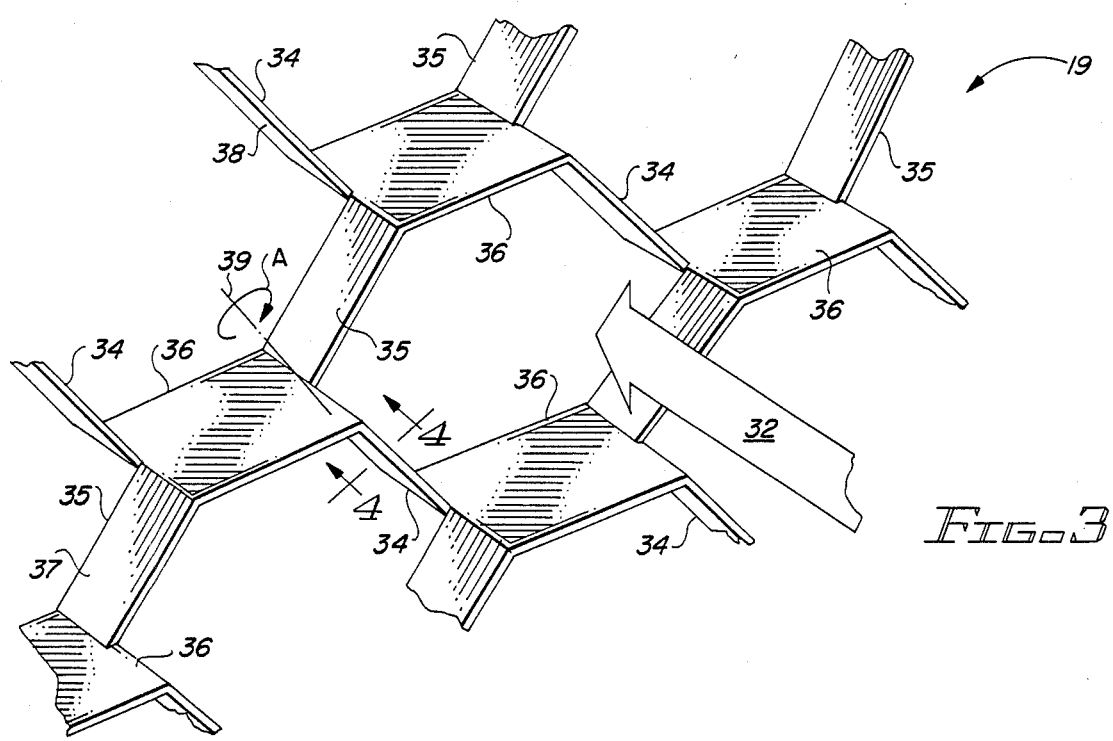
FIG. 3 is a perspective view illustrating a portion of the structure utilized to form eddy currents in air entering the cooler unit of the invention to promote the turbulent intermixing of the air with particles of water.
Figure 4:
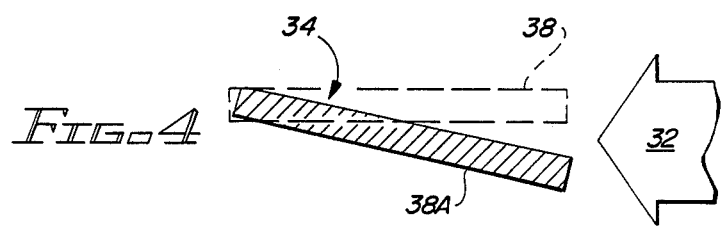
FIG. 4 is a section view of a portion of the structure of FIG. 3 illustrating the canting thereof.
Figure 5:
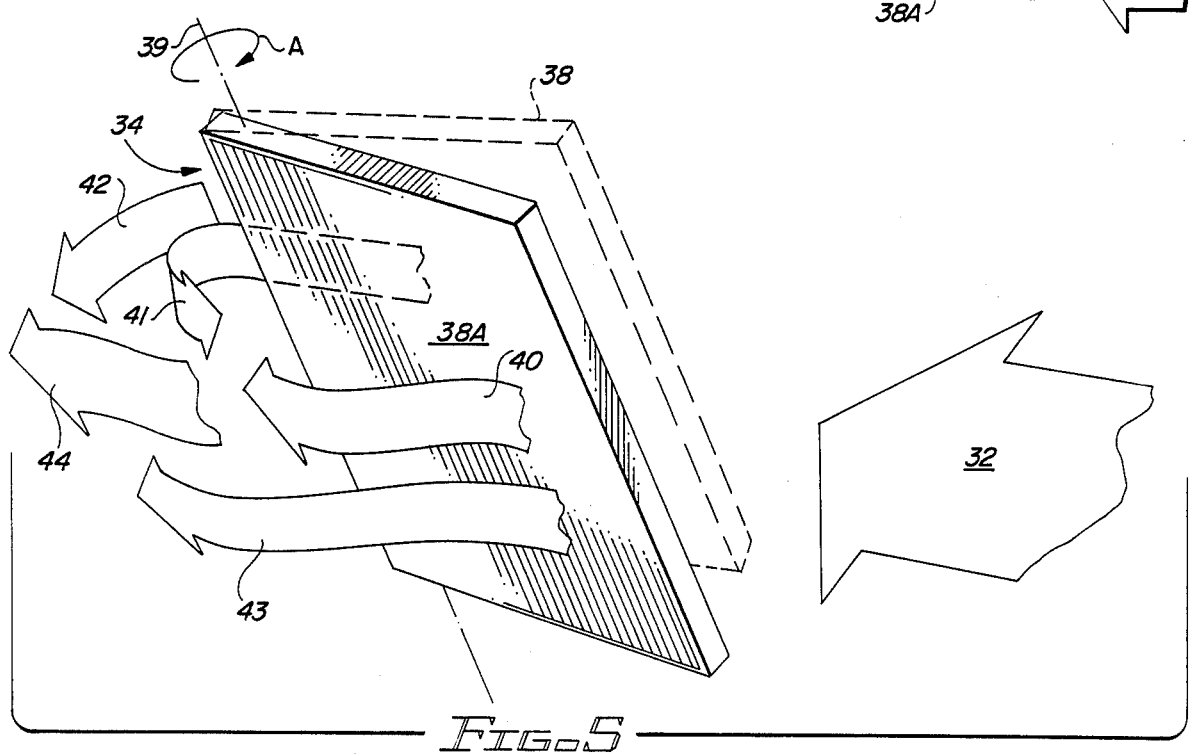
FIG. 5 is a perspective view of a portion of the structure of FIG. 3 illustrating the turbulent flow of air therearound; and, FIG. 6 is a schematic diagram depicting a microprocessor embodiment of the invention.

The presently preferred grating 19 is illustrated in FIGS. 3 and 4 and is identical to gratings 21 and 22. The shape and dimension of grating 21 facilitates the formation of eddy currents in stream 32 passing through grating 19 and therefore promotes the efficient intermixing of mist stream 31 and stream 32 and the evaporation of mist stream 31 in stream 32. As shown in FIG. 3, grating 19 is comprised of a plurality of interconnected rectangular panel-shaped legs 34, 35, 36 which define a plurality of adjacent hexagonal shaped apertures through which air stream 32 flows. Cylindrically shaped legs can be utilized in place of rectangular legs 34–36, but do not as effectively produce eddy currents in air stream 32. Each elongate leg 34, 35, 36 has a planar upper surface 37 spaced apart from, opposed to, and generally parallel to a planar lower surface 38A of generally identical dimension. If each leg 34, 35, and 36 were oriented such that upper and lower surfaces 37, 38A were parallel to the direction of travel of stream 32, then the flow of air around legs 34, 35 and 36 would have a greater tendency to be laminar and not to generate eddy currents and turbulent areas in air stream 32. As shown in FIGS. 4 and 5, surfaces 37, 38 are not parallel to the direction of travel of airstream 38 because each leg 34, 35, and 36 is slightly canted or rotated about a longitudinal axis 39 extending along the rear edge of the leg. In FIGS. 4 and 5, the ghost outline of member 34 represented by dashed lines 38 represents the orientation leg 34 would have if its upper and lower planar surfaces 37 and 38A were parallel to the direction of travel of stream 32. Instead, the actual orientation of leg 34 with respect to stream 32 is obtained by rotating the ghost outline 40 slightly about axis 39 in the direction of arrow A. When each leg 34 is canted into stream 32, turbulent air flow is caused in the manner indicated by arrows 40–44 in FIG. 4. Similar turbulent airflow is caused by screen 21 positioned intermediate mist stream 31 and pad 20. The turbulent airflow around screen 21 further facilitates the evaporation of water in stream 32 prior to the exiting 33 of the air stream from unit 11. Screen 22 serves the same water-air intermixing function just described for screen 19 and 21.

The particular advantages of the apparatus of the invention are that when a dry pad 20 is slidably inserted in unit 11 and operation of the unit is initiated, air 32 flowing into the unit is immediately cooled. It is not necessary for pad 20 to become wetted before cooling occurs. Maintenance of the unit is greatly reduced because little, if any, excess water is produced by the unit. Operating unit 11 without continuously directing a downward flow of water through pad 20 increases the operational life of pad 20. Unit 11 is especially useful as a precooler because cooled air 33 exiting the unit has few, if any, water droplets which can collect on the condenser coil of a refrigeration unit.

Eddy current screens 21 and 22 can be in a position which is immediately adjacent or spaced apart from pad 20. If unit 11 is operated without screen 19 in place, the passage of air stream 32 through mist 31 still creates air turbulence which facilitates the intermixing of water and air; however, when eddy currents exist in stream 32 when stream 32 contacts stream 31, intermixing of air and water appears to be greatly facilitated.

When unit 11 is operating at peak efficiency, stream 33 will not contain excess water droplets which can collect on the condenser coil of a refrigeration unit.

Having described the invention in such terms as to enable those skilled in the art to which it pertains to understand and practice it, and having described the presently preferred embodiments and best mode thereof, I claim:

1. In combination with a refrigeration unit, an evaporative heat exchange unit for precooling an air stream traveling toward and over the condensing coil of the refrigeration unit, said heat exchange unit including (a) a frame;

(b) a porous heat transfer pad mounted in said frame;

(c) nozzle means carried on said frame for directing a spray mist forwardly of said heat transfer pad, said spray mist emitted from said nozzle means initially traveling in a direction of travel such that said mist will not contact said porous heat transfer pad;

(d) means mounted on said frame for causing the turbulent intermixing of said air stream with said spray mist prior to said air stream passing through the porous heat transfer pad; and, (e) means for controlling the quantity of water emitted by said nozzle means such that substantially all of said spray mist is intermixed with said air stream prior to said air stream passing through said heat transfer pad; said frame being shaped and dimensioned and positioned with respect to said condensing coil such that said air stream passes through said spray mist and heat transfer pad before passing over said coil.

2. A method of precooling an air stream which travels toward and over the condensor coil of a refrigeration unit, said method including the steps of (a) positioning an evaporative heat exchange unit forwardly of said refrigeration unit condensor coil such that said air stream travels through said heat exchange unit prior to traveling over said condensor coil, said head exchange including (i) a frame, (ii) a porous dry heat transfer pad mounted in said frame and having a lower edge, (iii) nozzle means carried on said frame for directing a spray mist forwardly of said heat transfer pad, said spray mist emitted from said nozzle means initially moving in a direction of travel such that said mist will not contact said heat transfer pad, (iv) means mounted on said frame for causing the turbulent intermixing of said airstream with said spray mist prior to said airstream passing through said porous heat transfer pad, (v) means for controlling the quantity of water emitted by said nozzle means such that substantially all of said spray mist is intermixed with and evaporated in said air stream prior to said airstream passing through said heat transfer pad;

(b) operating said heat transfer unit to direct water through said nozzle means to produce said spray mist;

said heat exchange unit instantly cooling air traveling therethrough.

* * * * *